(12) United States Patent
Monsheimer et al.

(10) Patent No.: US 7,317,044 B2
(45) Date of Patent: Jan. 8, 2008

(54) POLYMER POWDER WITH PHOSPHONATE-BASED FLAME RETARDANT, PROCESS FOR ITS PRODUCTION, AND MOLDINGS PRODUCED FROM THIS POLYMER POWDER

(75) Inventors: Sylvia Monsheimer, Haltern am See (DE); Maik Grebe, Bochum (DE); Franz-Erich Baumann, Duelmen (DE)

(73) Assignee: Degussa AG, Duesseldorf (DE)

( * ) Notice: Subject to any disclaimer, the term of this patent is extended or adjusted under 35 U.S.C. 154(b) by 428 days.

(21) Appl. No.: 10/892,092

(22) Filed: Jul. 16, 2004

(65) Prior Publication Data

US 2005/0027047 A1  Feb. 3, 2005

(30) Foreign Application Priority Data

Jul. 29, 2003  (DE) .............................. 103 34 497

(51) Int. Cl.
*C08K 9/10* (2006.01)
*C08K 5/5333* (2006.01)

(52) U.S. Cl. ..................... 523/207; 524/123; 524/130
(58) Field of Classification Search ................ 524/123, 524/130; 523/207
See application file for complete search history.

(56) References Cited

U.S. PATENT DOCUMENTS

| | | | |
|---|---|---|---|
| 4,070,336 A * | 1/1978 | Birum ......................... | 524/118 |
| 4,073,767 A * | 2/1978 | Birum ......................... | 524/118 |
| 4,086,205 A * | 4/1978 | Birum ......................... | 524/120 |
| 4,174,343 A * | 11/1979 | Hardy et al. ................. | 524/120 |
| 5,405,936 A | 4/1995 | Mumcu et al. | |
| 5,412,014 A * | 5/1995 | Romenesko ................. | 524/416 |
| 5,668,242 A | 9/1997 | Simon et al. | |
| 5,859,147 A * | 1/1999 | Dalla Torre et al. ........ | 525/400 |
| 5,871,570 A * | 2/1999 | Koyama et al. ........... | 106/18.18 |
| 5,932,687 A | 8/1999 | Baumann et al. | |
| 6,060,550 A | 5/2000 | Simon et al. | |
| 6,149,836 A | 11/2000 | Mumcu et al. | |
| 6,300,413 B1 | 10/2001 | Simon et al. | |
| 6,316,537 B1 | 11/2001 | Baumann et al. | |
| 6,335,101 B1 | 1/2002 | Haeger et al. | |
| 6,362,288 B1 * | 3/2002 | Brewer et al. .............. | 525/431 |
| 6,384,128 B1 * | 5/2002 | Wadahara et al. .......... | 524/496 |
| 6,579,581 B2 | 6/2003 | Bartz et al. | |
| 6,589,606 B2 | 7/2003 | Waterkamp et al. | |
| 6,656,997 B2 | 12/2003 | Baumann et al. | |
| 6,677,015 B2 | 1/2004 | Himmelmann et al. | |
| 6,743,868 B2 * | 6/2004 | Fournier et al. ............. | 525/431 |
| 6,766,091 B2 * | 7/2004 | Beuth et al. ................. | 385/128 |
| 6,784,227 B2 | 8/2004 | Simon et al. | |
| 6,884,485 B2 | 4/2005 | Baumann et al. | |
| 7,138,448 B2 * | 11/2006 | Kaprinidis et al. ......... | 524/101 |
| 2003/0114636 A1 | 6/2003 | Schiffer et al. | |
| 2003/0124281 A1 | 7/2003 | Ries et al. | |
| 2004/0086735 A1 | 5/2004 | Monsheimer et al. | |
| 2004/0097636 A1 | 5/2004 | Baumann et al. | |
| 2004/0102539 A1 | 5/2004 | Monsheimer et al. | |
| 2004/0106691 A1 | 6/2004 | Monsheimer et al. | |
| 2004/0137228 A1 | 7/2004 | Monsheimer et al. | |
| 2004/0138363 A1 | 7/2004 | Baumann et al. | |
| 2004/0140668 A1 | 7/2004 | Monsheimer et al. | |
| 2004/0180980 A1 | 9/2004 | Petter et al. | |
| 2004/0204531 A1 | 10/2004 | Baumann et al. | |
| 2004/0206443 A1 | 10/2004 | Monsheimer et al. | |
| 2005/0014842 A1 | 1/2005 | Baumann et al. | |
| 2005/0027047 A1 | 2/2005 | Monsheimer et al. | |
| 2005/0027050 A1 | 2/2005 | Monsheimer et al. | |
| 2005/0038201 A1 | 2/2005 | Wursche et al. | |
| 2006/0244169 A1 | 11/2006 | Monsheimer et al. | |

FOREIGN PATENT DOCUMENTS

| | | |
|---|---|---|
| EP | 0 659 816 A2 | 6/1995 |
| EP | 0 911 142 A1 | 4/1999 |
| WO | WO 98/39381 | 9/1998 |

OTHER PUBLICATIONS

U.S. Appl. No. 11/694,129, filed Mar. 30, 2007, Monsheimer et al.
U.S. Appl. No. 11/671,820, filed Feb. 6, 2007, Monsheimer et al.

* cited by examiner

*Primary Examiner*—Peter Szekely
(74) *Attorney, Agent, or Firm*—Oblon, Spivak, McClelland, Maier & Neustadt, P.C.

(57) ABSTRACT

The present invention relates to a polymer powder composed of polyamide or of copolyamides, which also comprises flame retardant, in particular phosphonates, to a layer-by-layer process which selectively melts regions or selectively binds them, and also to moldings produced from this polymer powder. Compared with conventional products, the moldings constructed using the powder of the invention exhibit marked advantages in flammability and combustibility and drop behavior, particularly with respect to UL® (Underwriters Laboratories) classification. Furthermore, moldings produced from polymer powder of the invention have adequately good mechanical properties when compared with moldings based on polymer powders without flame retardant, in particular in terms of modulus of elasticity and tensile strain at break. In addition, these moldings also have a density close to that of injection moldings.

16 Claims, No Drawings

POLYMER POWDER WITH PHOSPHONATE-BASED FLAME RETARDANT, PROCESS FOR ITS PRODUCTION, AND MOLDINGS PRODUCED FROM THIS POLYMER POWDER

BACKGROUND OF THE INVENTION

1. Field of the Invention

The invention relates to a polymer powder based on polyamide or on copolyamides, preferably nylon-12, which comprises phosphonate-containing flame retardant, to a process for producing this powder, and also to moldings produced by a layer-by-layer process which selectively melts regions or selectively binds them to one another, from this powder.

2. Discussion of the Background

Very recently, a requirement has arisen for the rapid production of prototypes. Selective laser sintering is a process particularly well suited to rapid prototyping. In this process, polymer powders in a chamber are selectively irradiated briefly with a laser beam, resulting in melting of the particles of powder on which the laser beam falls. The molten particles fuse and solidify again to give a solid mass. Three-dimensional bodies, including those of complex shape, can be produced simply and rapidly by this process, by repeatedly applying fresh layers and irradiating these.

The process of laser sintering (rapid prototyping) to realize moldings made from pulverulent polymers is described in detail in patent specifications U.S. Pat. No. 6,136,948 and WO 96/06881 (both DTM Corporation). A wide variety of polymers and copolymers is claimed for this application, e.g. polyacetate, polypropylene, polyethylene, ionomers, and polyamide.

Nylon-12 powder (PA 12) has proven particularly successful in industry for laser sintering to produce moldings, in particular to produce engineering components. The parts manufactured from PA 12 powder meet the high requirements demanded with regard to mechanical loading, thus having properties particularly close to those of the mass-production parts subsequently produced by extrusion or injection molding.

A PA 12 powder with good suitability here has a median particle size ($d_{50}$) of from 50 to 150 µm, and is obtained as in DE 19708946 or as in DE 4421454, for example. It is preferable here to use a nylon-12 powder whose melting point is from 185 to 189° C., whose enthalpy of fusion is 112 J/g, and whose freezing point is from 138 to 143° C., as described in EP 0911142.

Other processes with good suitability are the SIB process, as described in WO 01/38061, or a process as described in EP 1015214. The two processes operate using infrared heating over an area to melt the powder, and selectivity is achieved in the first process by applying an inhibitor, and in the second process by way of a mask. Another process which has found wide acceptance in the market is 3D printing, as in EP 0431924, where the moldings are produced by curing of a binder applied selectively to the powder layer. Another process is described in DE 10311438, in which the energy required for melting is introduced by way of a microwave generator, and selectivity is achieved by applying a susceptor.

For these processes, use may be made of pulverulent substrates, in particular polymers or copolymers, preferably selected from polyester, polyvinyl chloride, polyacetal, polypropylene, polyethylene, polystyrene, polycarbonate, poly(N-methylmethacrylimide) (PMMI), polymethyl methacrylate (PMMA), ionomer, polyamide, copolyester, copolyamides, terpolymers, acrylonitrile-butadiene-styrene copolymers (ABS), or a mixture of these.

Although the known polymer powders intrinsically have good properties, moldings produced using these powders still have some disadvantages. A particular disadvantage with the polymer powders currently used is their high flammability and combustibility. This currently inhibits the use of processes described above in short runs in aircraft construction, for example.

SUMMARY OF THE INVENTION

It was therefore an object of the present invention to provide a polymer powder which can be used in one of the processes described above to produce parts of lower flammability. In particular, the intention here is to achieve the Underwriters Laboratories (UL®) V-0 classification; wherein a V-0 classification means that burning stops within 10 seconds on a vertical specimen, and no drips are allowed; a V-1 classification means that burning stops within 30 seconds on a vertical specimen, and no drips allowed; and a V-2 classification means that burning stops within 30 seconds on a vertical specimen, and drips of flaming particles are allowed.

Surprisingly, it has now been found that addition of phosphonate-containing flame retardants to polymers can produce polymer powders which can be used in layer-by-layer processes in which regions are melted or selectively bound, to produce moldings which achieve markedly better UL® classification than moldings composed of conventional polymer powders. For example, this method can achieve UL® V-0 classification. It is particularly advantageous if the mechanical properties of the components are simultaneously retained.

DETAILED DESCRIPTION OF THE INVENTION

The present invention therefore provides a polymer powder for processing in a layer-by-layer process in which regions are selectively melted or bound to one another, wherein the powder comprises at least one polymer and at least one phosphonate-containing flame retardant.

The present invention also provides a process for producing polymer powder of the invention, which comprises mixing at least one polymer powder in the presence of a solvent in which the phosphonate-containing flame retardant has at least low solubility, and then removing the dispersion medium/solvent. The melting points of the flame retardants used must, of course, be above room temperature.

The present invention also provides moldings produced by a layer-by-layer process in which regions are selectively melted or selectively bound to one another, wherein the moldings comprise phosphonate-containing flame retardant and at least one polymer.

The polymer powder of the invention has the advantage that it can be used in a layer-by-layer process in which regions are selectively melted or selectively bound to one another to produce moldings which have low flammability and combustibility. Moldings which achieve UL® V-0 classification are therefore obtainable. Addition of flame retardant mostly impairs the mechanical properties of the moldings. Nevertheless, the moldings of the invention retain good tensile strain at break and an only slightly reduced modulus of elasticity, when compared with moldings composed of material to which no flame retardant has been added. This opens up application sectors which were inaccessible hitherto for reasons of poor combustibility classification.

The polymer powder of the invention is described below, as is a process for its production, but there is no intention that the invention be restricted thereto.

A feature of the polymer powder of the invention for processing in a layer-by-layer process in which regions are selectively melted or selectively bound to one another is that the powder comprises at least one polymer or copolymer and at least one phosphonate-containing flame retardant.

A polyamide preferably present in the polymer powder of the invention is a polyamide which has at least 8 carbon atoms per carbonamide group. The polymer powder of the invention preferably comprises at least one polyamide which contains 10 or more carbon atoms per carbonamide group. The polymer powder particularly preferably comprises at least one polyamide selected from nylon-6,12 (PA 612), nylon-11 (PA 11), and nylon-12 (PA 12).

The polymer powder of the invention preferably comprises polyamide with a median particle size of from 10 to 250 µm, preferably from 45 to 100 µm, and particularly preferably from 50 to 80 µm.

A polymer powder particularly suitable for laser sintering is a nylon-12 powder whose melting point is from 185 to 189° C., preferably from 186 to 188° C., whose enthalpy of fusion is 112±17 J/g, preferably from 100 to 125 J/g, and whose freezing point is from 133 to 148° C., preferably from 139 to 143° C. The process for the production of the polyamide powder on which the polymer powders of the invention are based is well-known, and in the case of PA 12 may be found by way of example in the publications DE 2906647, DE 3510687, DE 3510691, and DE 4421454, which are incorporated by way of reference in the disclosure content of the present invention. The polyamide pellets required may be purchased from various producers, and by way of example nylon-12 pellets are supplied as VESTAMID® by Degussa AG.

For the processes which do not use a laser, a copolymer powder has particularly good suitability, in particular a copolyamide powder.

The polymer powder of the invention preferably comprises, based on the entirety of the components present in the powder, from 1 to 30% by weight of at least one phosphonate-containing flame retardant, preferably from 5 to 20% by weight of a phosphonate-containing flame retardant, particularly preferably from 8 to 15% by weight of a phosphonate-containing flame retardant, and very particularly preferably from 10 to 12% by weight of a phosphonate-containing flame retardant.

If the content of the phosphonate-containing flame retardant is below 1% by weight based on the entirety of the components present in the powder, there is a marked reduction in the desired effect of low flammability and low combustibility. If the content of the phosphonate-containing flame retardant is above 30% by weight, based on the entirety of the components present in the powder, the mechanical properties of the moldings produced from these powders become markedly poorer, the modulus of elasticity for example.

The phosphonate-containing flame retardant present in the polymer powder of the invention is preferably Antiblaze 1045, which is commercially available and can be purchased from Rhodia.

For applying the powders to the layer to be processed it is advantageous if the phosphonate-containing flame retardant encapsulates the polymer grains, this being achievable by wet-mixing of polymer dispersions in a solvent in which the phosphonate-containing flame retardant has at least low solubility, because the resultant treated particles have particularly good distribution of the flame retardant. However, it is also possible to use powders with phosphonate-based flame retardant incorporated by compounding in bulk, with subsequent use of low-temperature milling to give powder. Suitable flow aids, such as fumed aluminum oxide, fumed silicon dioxide, or fumed titanium dioxide, may be added to the resultant powder.

Polymer powder of the invention may therefore comprise these, or else other, auxiliaries, and/or filler. By way of example, these auxiliaries may be the abovementioned flow aids, e.g. fumed silicon dioxide or else precipitated silicas. By way of example, fumed silicon dioxide is supplied with the product name Aerosil® with various specifications by Degussa AG. Polymer powder of the invention preferably comprises less than 3% by weight, with preference from 0.001 to 2% by weight, and very particularly preferably from 0.05 to 1% by weight, of these auxiliaries, based on the entirety of the polyamides present. By way of example, the fillers may be glass particles, metal particles, or ceramic particles, e.g. solid or hollow glass beads, steel shot, granulated metal, or else color pigments, e.g. transition metal oxides.

The median grain size of the filler particles here are preferably smaller than or approximately equal to that of the particles of the polyamides. The median grain size $d_{50}$ of the fillers should preferably not exceed the median grain size $d_{50}$ of the polyamides by more than 20%, with preference 15%, and with very particular preference 5%. A particular limitation on the particle size results from the permissible overall height or, respectively, layer thickness in the layer-by-layer apparatus.

Polymer powder of the invention preferably comprises less than 75% by weight, with preference from 0.001 to 70% by weight, particularly preferably from 0.05 to 50% by weight, and very particularly preferably from 0.1 to 25% by weight, of these fillers, based on the entirety of the components present.

If the stated maximum limits for auxiliaries and/or fillers are exceeded, depending on the filler or auxiliary used, there can be marked impairment of mechanical properties of moldings produced from these polymer powders.

The polymer powders of the invention can be produced simply, preferably by the process of the invention for producing polymer powder of the invention, by mixing at least one polyamide with at least one phosphonate-containing flame retardant, preferably by incorporation through wet-mixing. By way of example, a polymer powder obtained by reprecipitation or by milling may be dissolved or suspended in an organic solvent and mixed with the phosphonate-containing flame retardant, or else the polymer powder may be mixed in bulk with phosphonate-containing flame retardant. In the case of operation in a solvent, the phosphonate-containing flame retardant is preferably present in solution, or at least to some extent in solution, in a solvent when mixed with a solvent which comprises the polymer, whereupon either this solvent may comprise the dissolved polymer and the polymer powder is obtained by precipitation of the polymers from the flame-retardant-containing solvent, or the solvent may comprise the suspended pulverulent polymer and the polymer powder is obtained by removing the solvent.

In the simplest embodiment of the process of the invention, a very wide variety of known methods may be used to achieve a fine-particle mixture. For example, the mixing method may be wet-mixing in low-speed assemblies—e.g. paddle driers or circulating screw mixers (known as Nautamixers)—or by dispersion of the phosphonate-containing flame retardant and of the polymer powder in an organic solvent, followed by distillative removal of the solvent. In this procedure it is advantageous if the organic solvent dissolves the phosphonate-containing flame retardant, at least at low concentration, because the flame retardant can encapsulate the polyamide grains during the drying process. Examples of solvent suitable for this variant are lower alcohols having from 1-3 carbon atoms, and ethanol may preferably be used as solvent.

In one of these first variants of the process of the invention, the polyamide powder may be a polyamide powder intrinsically suitable as a laser sintering powder, phosphonate-containing flame retardant simply being admixed thereto. For this, it is advantageous for at least the flame retardant to be at least to some extent dissolved or heated, in order to reduce viscosity. In another embodiment, the polyamide grains may also be in suspended form.

In another variant of the process, the phosphonate-containing flame retardant is mixed with a, preferably molten, polyamide through incorporation by compounding, and the resultant flame-retardant-containing polyamide is processed by (low-temperature) grinding or reprecipitation to give laser sintering powder. The compounding process usually gives pellets which are then processed to give polymer powder. This conversion process may take place via milling or reprecipitation, for example. The process variant in which the flame retardant is incorporated by compounding has the advantage, when compared with the pure mixing process, of achieving more homogenous distribution of the phosphonate-containing flame retardant in the polymer powder.

In this instance, a suitable flow aid will be added to the precipitated or low-temperature-ground powder to improve flow behavior, examples being fumed aluminum oxide, fumed silicon dioxide, or fumed titanium dioxide.

In another preferred process variant, the phosphonate-containing flame retardant is admixed with an ethanolic solution of the polymer before the process of precipitation of the polymer has been completed. By way of example, DE 3510687 and DE 2906647 describe this precipitation process. This process may be used by way of example to precipitate nylon-12 from an ethanolic solution via controlled cooling, following a suitable temperature profile. Reference is made to DE 3510687 or DE 2906647 for a detailed description of the precipitation process.

The person skilled in the art may use this process variant in a modified form for a broad range of polymers, polymer and solvent being selected here in such a way that the polymer dissolves in the solvent at an elevated temperature, and that the polymer precipitates from the solvent at a lower temperature and/or on removal of the solvent. The corresponding laser sintering polymer powders of the invention are obtained by adding phosphonate-containing flame retardant to this solution, and then drying.

The phosphonate-containing flame retardant used may preferably comprise a phosphonate containing cyclic ester structures, e.g. Antiblaze 1045®, this being a commercially available product which can be purchased from Rhodia.

To improve processability, or for further modification of the polymer powder, this may receive additions of inorganic color pigments, e.g. transition metal oxides, stabilizers, e.g. phenols, in particular sterically hindered phenols, flow aids, e.g. fumed silicas, or else filler particles. The amount of these substances added to the polymer powder, based on the total weight of components in the polymer powder, is preferably such as to comply with the concentrations stated for fillers and/or auxiliaries for the polymer powder of the invention.

The present invention also provides processes for producing moldings by selective laser sintering, by using polymer powders of the invention, which comprise polymers and phosphonate-containing flame retardants. The present invention in particular provides a process for producing moldings by a layer-by-layer process which selectively melts or selectively binds parts of a phosphonate-containing precipitation powder based on a nylon-12 whose melting point is from 185 to 189° C., whose enthalpy of fusion is 112±17 J/g, and whose freezing point is from 136 to 145° C., the use of which is described in U.S. Pat. No. 6,245,281.

These processes are well-known, and are based on the selective sintering of polymer particles, layers of polymer particles being briefly exposed to laser light with resultant binding between the polymer particles exposed to the laser light. Three-dimensional objects are produced by successive sintering of layers of polymer particles. By way of example, details of the selective laser sintering process are found in the publications U.S. Pat. No. 6,136,948 and WO 96/06881.

The moldings of the invention, produced by selective laser sintering, comprise a phosphonate-containing flame retardant and polymer. The moldings of the invention preferably comprise at least one polyamide which contains at least 8 carbon atoms per carbonamide group. Moldings of the invention very particularly preferably comprise at least one nylon-6,12, nylon-11, and/or one nylon-12, and at least one phosphonate-containing flame retardant.

Other processes with good suitability are the SIB process, as described in WO 01/38061, or a process as described in EP 1015214. The two processes operate using infrared heating over an area to melt the powder, and selectivity is achieved in the first process by applying an inhibitor, and in the second process by way of a mask. Another process which has found wide acceptance in the market is 3D printing, as in EP 0431924, where the moldings are produced by curing of a binder applied selectively to the powder layer. Another process is described in DE 10311438, in which the energy required for melting is introduced by way of a microwave generator, and selectivity is achieved by applying a susceptor.

For these processes, use may be made of pulverulent substrates, in particular polymers or copolymers, preferably selected from polyester, polyvinyl chloride, polyacetal, polypropylene, polyethylene, polystyrene, polycarbonate, poly(N-methylmethacrylimide) (PMMI), polymethyl methacrylate (PMMA), ionomer, polyamide, copolyester, copolyamides, terpolymers, acrylonitrile-butadiene-styrene copolymers (ABS), or a mixture of these.

The flame retardant present in the molding of the invention is preferably a cyclic organic phosphonate containing ester structures. It contains from 10 to 25% of phosphorus, particularly preferably from 18 to 22%. An example of a flame retardant of this type is Antiblaze 1045 from Rhodia.

The molding of the invention preferably comprises, based on the entirety of the components present in the molding, from 1 to 50% by weight of phosphonate-based flame retardants, preferably from 5 to 30% by weight, particularly preferably from 8 to 20% by weight, and very particularly preferably from 10 to 12% by weight.

The moldings may also comprise fillers and/or auxiliaries, e.g. heat stabilizers and/or antioxidants, e.g. sterically hindered phenol derivatives. Examples of fillers are glass particles, ceramic particles, and also metal particles, e.g. iron shot, or corresponding hollow beads. The moldings of the invention preferably comprise glass particles, very particularly preferably glass beads. Moldings of the invention preferably comprise less than 3% by weight, with preference from 0.001 to 2% by weight, and very particularly preferably from 0.05 to 1% by weight, of these auxiliaries, based on the entirety of the components present. Moldings of the invention also preferably comprise less than 75% by weight, with preference from 0.001 to 70% by weight, particularly preferably from 0.05 to 50% by weight, and very particularly preferably from 0.5 to 25% by weight, of these fillers, based on the entirety of the components present.

The examples below are intended to describe the polymer powder of the invention and its use, without restricting the invention to the examples.

The BET surface area determination carried out in the examples below complied with DIN 66131. Bulk density was determined using an apparatus to DIN 53466. A Malvern Mastersizer S, version 2.18, was used to obtain the laser scattering values.

Having generally described this invention, a further understanding can be obtained by reference to certain specific examples which are provided herein for purposes of illustration only, and are not intended to be limiting unless otherwise specified.

EXAMPLES

Example 1

Incorporation of Antiblaze™ 1045 by Reprecipitation.

40 kg of unregulated PA 12 prepared by hydrolytic polymerization (the preparation of this type of polyamide being described by way of example in DE 2152194, DE 2545267, or DE 3510690) with a relative solution viscosity $\eta_{rel.}$ of 1.61 (in acidified m-cresol) and with an end group content of 72 mmol/kg COOH and 68 mmol/kg NH2 are heated to 145° C. with 0.3 kg of IRGANOX® 1098 and 4.44 kg of Antiblaze™ 1045, and also 350 L of ethanol, denatured with 2-butanone and 1% water content, within 5 hours in a 0.8 m³ stirred tank (diameter=90 cm, height=170 cm), and held for 1 hour at this temperature, with stirring (blade stirrer, diameter=42 cm, rotation rate=91 rpm). The jacket temperature was then reduced to 120° C., and the internal temperature was brought to 120° C. at a cooling rate of 45 K/h, at the same stirrer rotation rate. From this juncture onward, with the same cooling rate, the jacket temperature was maintained below the internal temperature by from 2 K to 3 K. Using the same cooling rate, the internal temperature was decreased to 117° C., and was then held constant for 60 minutes. The internal temperature was then brought to 111° C., using a cooling rate of 40 K/h. At this temperature, the precipitation began and was detectable through evolution of heat. After 25 minutes, the internal temperature decreased, indicating the end of the precipitation. The suspension is cooled to 75° C. and then transferred to a paddle drier. The ethanol is removed therefrom by distillation at 70° C. and 400 mbar with the stirrer system running, and the residue was then further dried at 20 mbar and 85° C. for 3 hours. A sieve analysis was carried out on the resultant product and gave the following result.

TABLE 1

| Sieve analysis of product produced in Example 1 | |
|---|---|
| Particle Size, μm | % by wt. |
| <32 μm: | 8% |
| <40 μm: | 17% |
| <50 μm: | 46% |
| <63 μm: | 85% |
| <80 μm: | 95% |
| <100 μm: | 100% |

BET: 6.8 m²/g
Bulk density: 430 g/L
Laser diffraction: d(10%): 44 μm, d(50%): 69 μm, d(90%): 97 μm.

Example 2

Incorporation of Antiblaze™ 1045 by Compounding and Reprecipitation 40 kg of regulated PA 12 (L1600) prepared by hydrolytic polymerization, with a relative solution viscosity $\eta_{rel.}$ of 1.61 (in acidified m-cresol) and with an end group content of 106 mmol/kg of COOH and 8 mmol/kg of NH$_2$ are extruded at 225° C. in a twin-screw compounder (Bersttorf ZE 25) with 0.3 kg of IRGANOX® 245 and 4.44 kg of Antiblaze® 1045, and strand-pelletized. This compounded material was then heated with 350 L of ethanol, denatured with 2-butanone and 1% water content, within 5 hours in a 0.8 m³ stirred tank (diameter=90 cm, height=170 cm), and held for 1 hour at this temperature, with stirring (blade stirrer, diameter=42 cm, rotation rate=91 rpm). The jacket temperature was then reduced to 120° C., and the internal temperature was brought to 120° C. at a cooling rate of 45 K/h, at the same stirrer rotation rate. From this juncture onward, with the same cooling rate, the jacket temperature was maintained below the internal temperature by from 2 K to 3 K. Using the same cooling rate, the internal temperature was decreased to 117° C., and then held constant for 60 minutes. The internal temperature was then decreased to 111° C., using a cooling rate of 40 K/h. At this temperature, the precipitation began and was detectable through evolution of heat. After 25 minutes, the internal temperature decreased, indicating the end of the precipitation. The suspension was cooled to 75° C. and then transferred to a paddle drier. The ethanol was removed therefrom by distillation at 70° C. and 400 mbar with the stirrer system running, and the residue was then further dried at 20 mbar and 85° C. for 3 hours. A sieve analysis was carried out on the resultant product and gave the following result:

BET: 7.3 m²/g
Bulk density: 418 g/L
Laser diffraction: d(10%): 36 μm, d(50%): 59 μm, d(90%): 78 μm.

Example 3

Incorporation of Antiblaze™ 1045 in Ethanolic Suspension

The procedure is as described in Example 1, but the flame retardant was not added initially, but 4.44 kg of Antiblaze™ 1045 were added at 75° C. only after the precipitation of the freshly precipitated suspension in the paddle drier. Drying and further work-up takes place as described in Example 1.

BET: 5.3 m²/g
Bulk density: 433 g/L

Laser diffraction: d(10%): 40 µm, d(50%): 61 µm, d(90%): 79 µm.

Example 4

Incorporation of Antiblaze™ 1045 in Ethanolic Suspension

The procedure is as described in Example 3, but 4.7 kg of Antiblaze™ 1045 were added at 75° C. to the freshly precipitated suspension in the paddle drier, and drying was completed as described in Example 1.

BET: 5.1 m²/g
Bulk density: 422 g/L
Laser diffraction: d(10%): 45 µm, d(50%): 65 µm, d(90%): 84 µm.

Example 5

Incorporation of Antiblaze™ 1045 in Ethanolic Suspension

The procedure is as described in Example 3, but 4.21 kg of Antiblaze™ 1045 were added at 75° C. to the freshly precipitated suspension in the paddle drier, and drying was completed as described in Example 1.

BET: 5.6 m²/g
Bulk density: 437 g/L
Laser diffraction: d(10%): 42 µm, d(50%): 55 µm, d(90%): 81 µm.

Example 6

Incorporation of Antiblaze™ 1045 within a Dry Blend 4444 g of (10% by weight) of Antiblaze™ 1045 were mixed in a dry-blend process utilizing a Schugi Flexomix mixer at 3000 rpm with 40 kg of nylon-12 powder produced as in DE 2906647 with a median grain diameter $d_{50}$ of 53 µm (laser diffraction) and with a bulk density to DIN 53466 of 443 g/L. This is a vertical tube of diameter 100 mm in which there is a moving rotor with spray nozzles. For this process, it is preferable to heat the flame-retardant additive in order to reduce the viscosity.

Example 7

Incorporation of Antiblaze™ 1045 within a Dry Blend 4444 g of (10% by weight) of Antiblaze™ 1045 were mixed in a dry-blend process utilizing a Schugi Flexomix mixer at 3000 rpm with 40 kg of copolyamide powder (Vestamelt 470) prepared as in DE 2906647 with a median grain diameter $d_{50}$ of 78 µm (laser diffraction) and with a bulk density to DIN 53466 of 423 g/L. This is a vertical tube of diameter 100 mm in which there is a moving rotor with spray nozzles. For this process, it is preferable to heat the flame-retardant additive in order to reduce the viscosity.

BET: 2.2 m²/g
Bulk density: 423 g/L
Laser diffraction: d(10%): 38 µm, d(50%): 78 µm, d(90%): 122 µm.

Comparative Example 1

40 kg of unregulated PA 12 prepared by hydrolytic polymerization, with a relative solution viscosity $\eta_{rel.}$ of 1.61 (in acidified m-cresol) and with an end group content of 72 mmol/kg of COOH and 68 mmol/kg of $NH_2$ were brought to 145° C. with 0.3 kg of IRGANOX® 1098 in 350 ml of ethanol, denatured with 2-butanone and 1% water content, within a period of 5 hours in a 0.8 m³ stirred tank (diameter=90 cm, height=170 cm), and held for 1 hour at this temperature, with stirring (blade stirrer, diameter=42 cm, rotation rate=91 rpm). The jacket temperature was then reduced to 120° C., and the internal temperature was brought to 120° C. at a cooling rate of 45 K/h, at the same stirrer rotation rate. From this juncture onward, with the same cooling rate, the jacket temperature was maintained below the internal temperature by from 2 K to 3 K. Using the same cooling rate, the internal temperature was decreased to 117° C., and then held constant for 60 minutes. The internal temperature was then decreased to 111° C., using a cooling rate of 40 K/h. At this temperature, the precipitation began and was detectable through evolution of heat. After 25 minutes, the internal temperature fell, indicating the end of the precipitation. The suspension was cooled to 75° C. and then transferred to a paddle drier. The ethanol was removed therefrom by distillation at 70° C. and 400 mbar with the stirrer system running, and the residue was then further dried at 20 mbar and 85° C. for 3 hours.

BET: 6.9 m²/g
Bulk density: 429 g/L
Laser diffraction: d(10%): 42 µm, d(50%): 69 µm, d(90%): 91 µm.

Further Processing

All of the specimens from Examples 1 to 7 were treated for 1 minute with 0.1% by weight of Aerosil 200 in a CM50 D Mixaco mixer, at 150 rpm. These powders were then used on an EOSINT P360 laser sintering system to construct dumbbell specimens to ISO 3167, and also fire-protection test specimens of 80×3.2×10 mm (length×width×height). A tensile test to EN ISO 527 was used to determine (Table 2) mechanical values on the components. Density was determined by a simplified internal method. For this, the tensiles produced to ISO 3167 (multipurpose test specimen) were measured, and from these measurements the volume was calculated, the weight of the tensile specimens was determined and density was calculated from volume and weight.

TABLE 2

UL ® Classification of the Specimens from Examples 1-7

| Parts composed from powders produced as described in Example No. | UL Classification | Modulus of elasticity, N/mm² | Thickness, mm |
|---|---|---|---|
| Example 1[a] | V-0 | 1588 | 3.9 |
| Example 2[b] | V-0 | 1711 | 4.0 |
| Example 3[c] | V-0 | 1501 | 4.0 |
| Example 4[d] | V-0 | 1454 | 4.1 |
| Example 5[e] | V-2 | 1673 | 3.7 |
| Example 6[f] | V-0 | 1632 | 3.9 |
| Example 7[g] | V-0 | 1207 | 3.8 |
| Comparative Example 1 | Unclassified | 1601 | 3.6 |

[a]Reprecipitation.
[b]Compounding and reprecipitation or milling.
[c]Suspension 10%.
[d]Suspension 15%.
[e]Suspension 5%.
[f]Dry Blend, Copolyamide.

As can be seen in Table 2, the incorporation of phosphonate-containing flame retardant by mixing achieves the improvement described in the following. Starting at a concentration of 10% of the phosphonate-containing flame retardant, a UL® V-0 classification is achieved. The components become only slightly thicker, but this can be corrected by reducing the amount of energy introduced by the laser.

The priority document of the present application, DE Application 10334497.7, filed Jul. 29, 2003, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A polymer powder for processing in a layer-by-layer process which selectively melts regions or selectively binds them to one another, which comprises:
   at least one polymer powder comprising a polyamide which has at least 8 carbon atoms per carbonamide group and
   at least one flame retardant having a phosphonate-containing flame retardant;
   wherein the phosphonate-containing flame retardant is present in an amount of from 5 to 30 wt. %, which is based on the entirety of the components present in the polymer powder, and
   wherein the grains of said polymer powder comprising a polyamide is encapsulated by said flame retardant.

2. A polymer powder as claimed in claim 1, wherein the at least one polymer powder comprises nylon-6,12, nylon-11, or nylon-12, or copolyamides based on the abovementioned polyamides.

3. A polymer powder as claimed in claim 1, wherein the phosphonate-containing flame retardant is present in an amount of from 5 to 20 wt. %, which is based on the entirety of the components present in the polymer powder.

4. A polymer powder as claimed in claim 1, wherein the phosphonate-containing flame retardant is present in an amount of from 8 to 15 wt. %, which is based on the entirety of the components present in the polymer powder.

5. A polymer powder as claimed in claim 1, wherein the phosphonate-containing flame retardant comprises cyclic esters.

6. A polymer powder as claimed in claim 1, which further comprises auxiliaries and/or filler.

7. A polymer powder as claimed in claim 6, wherein at least one auxiliary is a flow aid.

8. A polymer powder as claimed in claim 6, wherein the filler comprises glass particles.

9. A process for producing polymer powder as claimed in claim 1, which comprises:
   encapsulating the grains of said at least one polymer powder with a phosphonate-containing flame retardant.

10. A method, which comprises:
    producing a molding by a layer-by-layer process which comprises selectively melting regions or selectively binding regions to one another; wherein the regions comprise the polymer powder as claimed in claim 1.

11. A molding produced by a layer-by-layer process which comprises selectively melting regions or selectively binding regions to one another; wherein the regions comprises:
    at least one polymer comprising a polyamide which has at least 8 carbon atoms per carbonamide group and
    at least one flame retardant having a phosphonate-containing flame retardant;
    wherein the phosphonate-containing flame retardant is present in an amount of from 5 to 20 wt. %, which is based on the entirety of the components present in the polymer powder, and
    wherein the grains of said polymer powder comprising a polyamide is encapsulated by said flame retardant.

12. A molding as claimed in claim 11, wherein the polymer is nylon-6,12, nylon-11, and/or nylon-12, or copolyamides based on the abovementioned polyamides.

13. A molding as claim in claim 11, wherein the phosphonate-containing flame retardant is present in an amount of from 8 to 15 wt. %, which is based on the entirety of the components present in the polymer powder.

14. A molding as claimed in claim 13, wherein the phosphonate-containing flame retardant is present in an amount of from 10 to 12 wt. %, which is based on the entirety of the components present in the polymer powder.

15. A molding as claimed in 11, which further comprises fillers.

16. A molding as claimed in claim 15, wherein at least one of the fillers comprises glass particles.

* * * * *